United States Patent [19]

Fishman et al.

[11] Patent Number: 5,213,200
[45] Date of Patent: May 25, 1993

[54] VIBRATORY FLOW FEED CONVEYOR WITH REMOVABLE PAN

[75] Inventors: Oleg S. Fishman, Maple Glen, Pa.; Allan J. Jacks, Woodbury, N.J.; Robert T. Pipitone, Mount Laurel, N.J.; David L. Remalia, Marlton, N.J.

[73] Assignee: Inductotherm Corp., Rancocas, N.J.

[21] Appl. No.: 857,051

[22] Filed: Mar. 25, 1992

[51] Int. Cl.⁵ .............................................. B65G 27/08
[52] U.S. Cl. ..................................... 198/763; 198/771
[58] Field of Search ................ 198/763, 771; 414/415

[56] References Cited

U.S. PATENT DOCUMENTS

| | | | |
|---|---|---|---|
| 2,713,415 | 7/1955 | Wurzbach | 198/763 |
| 3,194,392 | 7/1965 | Manderbach | 198/771 |
| 4,602,711 | 7/1986 | Wullenwaber | 198/771 |
| 4,687,093 | 8/1987 | Marshall et al. | 198/771 |
| 4,843,579 | 6/1989 | Andrews et al. | 198/771 |

Primary Examiner—Joseph E. Valenza
Attorney, Agent, or Firm—Seidel, Gonda, Lavorgna & Monaco

[57] ABSTRACT

A vibratory flow feed conveyor with a removable conveyor pan includes a base mounted on a supporting surface, a vibrator frame fixed to the base, a conveyor pan mountable on the vibrator frame for oscillatory movement with respect thereto, connecting members on the conveyor pan and cooperating mating connector members on the vibrator frame for removably attaching the conveyor pan to the vibrator frame, and a vibrator operatively associated with the vibrator frame for imparting oscillatory movement to the vibrator frame and the conveyor pan.

8 Claims, 3 Drawing Sheets

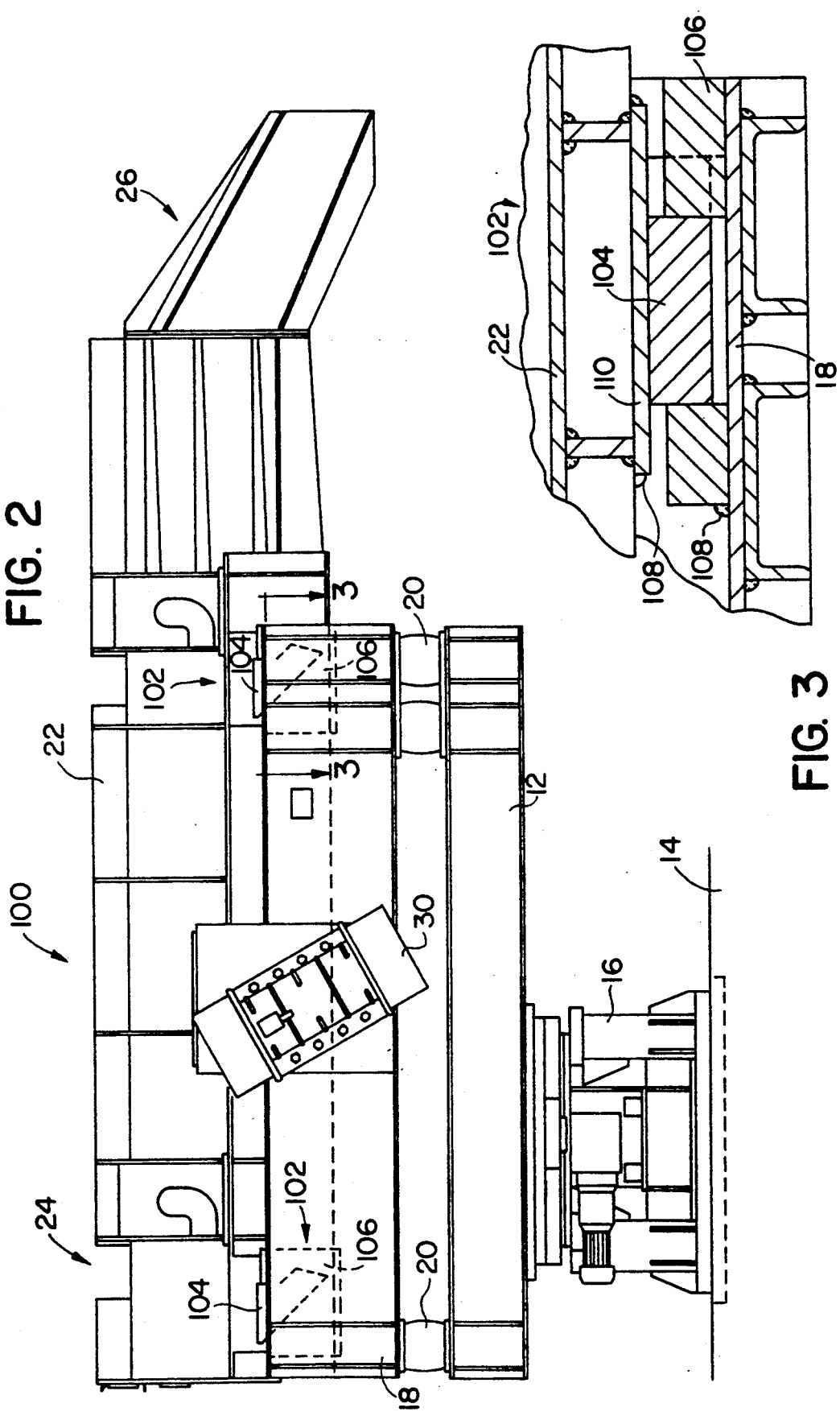
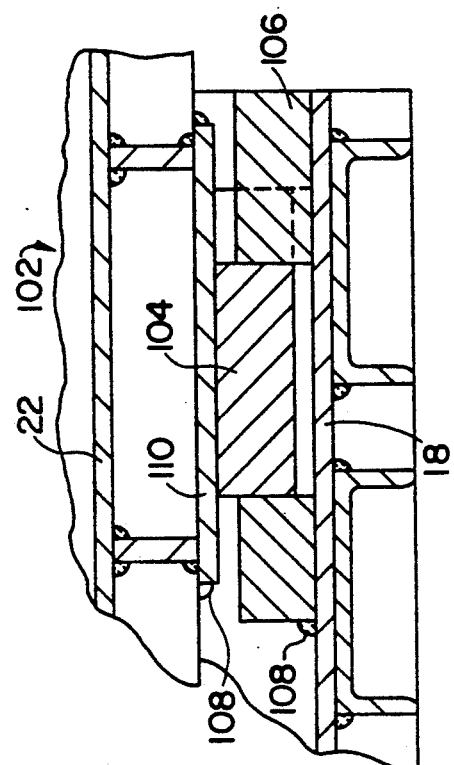
FIG. 2
FIG. 3

VIBRATORY FLOW FEED CONVEYOR WITH REMOVABLE PAN

FIELD OF THE INVENTION

The present invention relates to vibratory feed conveyors for bulk materials, such as but not limited to scrap metal to be fed to a melting furnace, and is applicable to all contexts in which bulk materials are to be conveyed from one location to another.

BACKGROUND OF THE INVENTION

Vibrating flow feed conveyors are used in many industries to convey bulk materials from one location to another. In the foundry industry, for example, vibrating flow feed conveyors are used to feed charges of scrap metal into furnaces. These conveyors are designed to move bulk material along a horizontal, or almost horizontal, path in a controlled system. They can be used to merely transport material from one point to another or to perform various functions on the material while it is en route, such as cooling, drying, blending, metering, spreading and the like.

Vibrating conveyors can be fed by a belt conveyor, but are more commonly used to provide a precisely controlled outlet from a bin, hopper or chute. Regardless of how they are fed, vibrating conveyors take a vertical flow of material and change the direction of movement up to 90°.

A vibrating conveyor basically consists of a base or reaction mass and a driven mass connected to each other by springs. The base, sometimes also called a frame, is excited by a power source such as an electromagnetic or electromechanical drive. A trough, or pan, forms part of the driven mass and serves as the material carrying surface. Normally, the pan is more-or-less permanently affixed to the frame, such as by being bolted to it. In operation, the pan is moved alternately forward and up, then down and back, by the power source. This causes the conveyed material to move along the pan surface in a series of short hops. Amplitude or frequency of vibration can be adjusted to control conveyor speed and output.

SUMMARY OF THE INVENTION

The present invention is directed to a vibratory flow feed conveyor, comprising a base mounted on a supporting surface, a vibrator frame mounted on said base, and a conveyor pan removably mounted on said vibrator frame. In a preferred embodiment of the invention, it comprises a vibratory flow feed conveyor having a removable conveyor pan, comprising base means mounted on a supporting surface, vibrator frame means fixed to said base means for oscillatory movement with respect thereto, conveyor pan means mountable on said vibrator frame means, connecting means on said conveyor pan means and cooperating mating connector means on said vibrator frame means for removably attaching said conveyor pan means to said vibrator frame means, and vibrator means operatively associated with said vibrator frame means for imparting said oscillatory movement to said vibrator frame means and said conveyor pan means.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a side elevational view, in simplified form, of a vibrating flow feed conveyor according to the present invention.

FIG. 3 is a partial sectional view of the conveyor of FIG. 2, taken along the lines 3—3 in FIG. 2.

DESCRIPTION OF THE INVENTION

Figure 1:
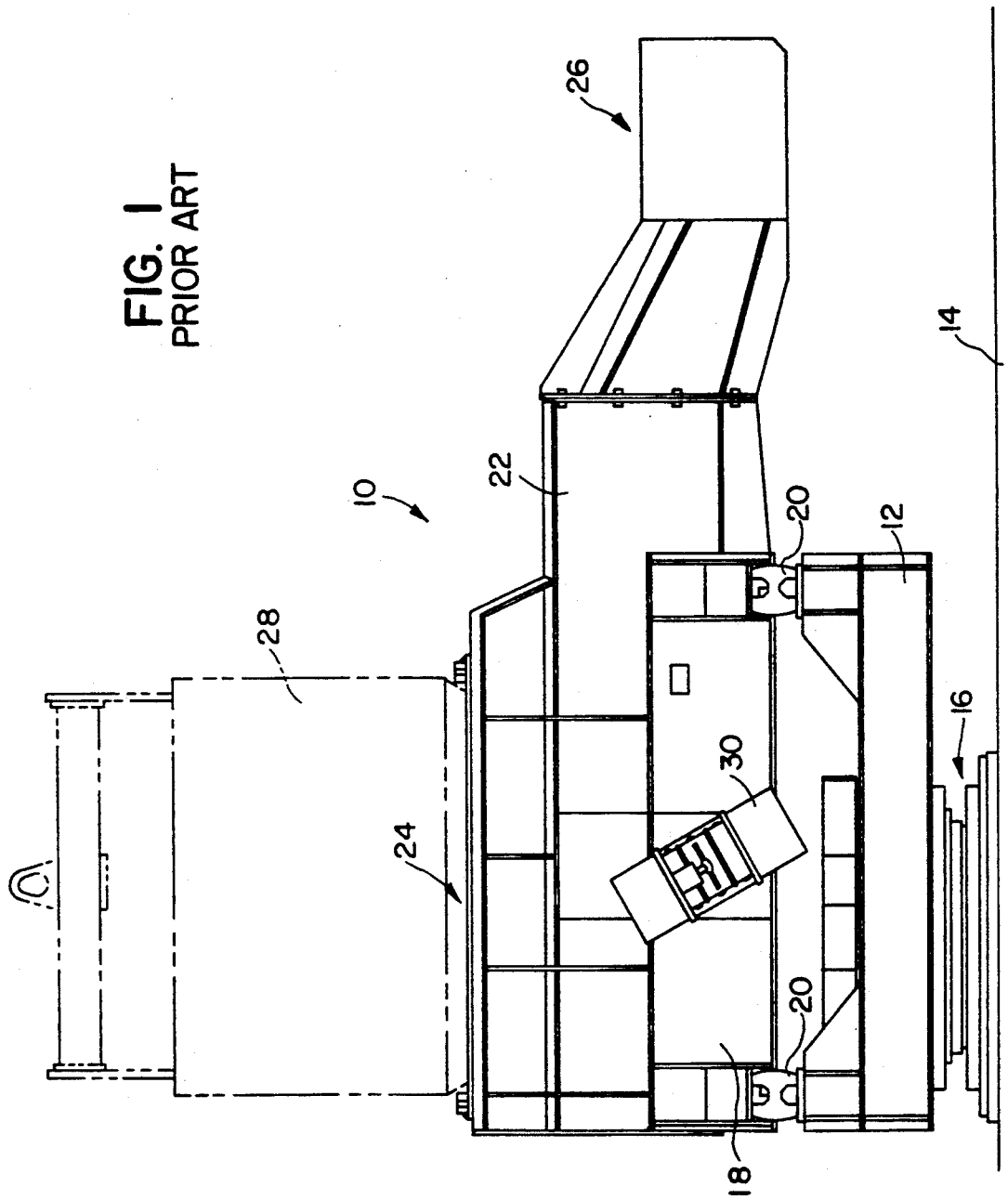
FIG. 1 is a side elevational view, in simplified form, of a vibrating flow feed conveyor according to the prior art.

Referring now to the drawings, wherein like numerals indicate like elements, there is shown in FIG. 1 a vibratory flow feed conveyor 10 according to the prior art. It will be understood that the conveyor herein described is intended to be illustrative of vibrating conveyors, and is not intended to limit the invention to any particular type or form of vibrating conveyor. That is, the conveyor 10 may be a pivoting vibrating conveyor, a fixed vibrating conveyor, an indexing vibrating conveyor, and so forth, without departing from the invention. In the illustrative embodiment of the invention, conveyor 10 comprises a base 12 which is mounted on a generally horizontal supporting surface such as floor 14 via a mounting means 16. A frame assembly 18 is mounted to the top of base 12 via vibration mounts 20. Vibration mounts 20 permit relative oscillatory movement between frame assembly 18 and base 12, but otherwise rigidly mount frame assembly 18 to base 12.

Conveyor 10 further comprises a conveyor pan 22 mounted to the top of frame assembly 18. Conveyor pan 22 is rigidly permanently mounted to frame assembly 18, such as by bolts or other suitable fasteners. For clarity, and since the particular fastening technique is not part of the present invention, the fasteners are omitted from FIG. 1. For all practical purposes, conveyor pan 22 is permanently attached to frame assembly 18, and its removal is not possible without disassembling substantially the entire conveyor 10.

Conveyor pan 22 has a material inlet portion 24 and a material outlet portion 26. Outlet portion 26 is located above a structure (not shown) to receive material conveyed and discharged by conveyor pan 22. One, but by no means the only, example of such a structure is a coreless induction furnace used for heating and/or melting scrap metal.

Material to be conveyed by conveyor 10 is supplied to inlet portion 24 from above by a bucket 28. Bucket 28 typically has a drop bottom. Bucket 28 is filled with material to be conveyed at a separate location and then placed over inlet end 24 of conveyor pan 22. Alternatively, bucket 28 may remain in place above inlet end 24 and be filled by a suitable feed means such as a bin, hopper, belt or the like. In any case, when it is desired to feed material from bucket 28 to conveyor pan 22, the bottom of bucket 28 is opened and the material in the bucket falls by gravity into conveyor pan 22.

Of course, bucket 28 is only one way of charging conveyor pan 22. If desired, conveyor pan 22 may be charged by any suitable apparatus such as belt conveyors, hoppers, vibratory conveyors, front end loaders and so forth.

Frame assembly 18 and conveyor pan 22 are excited into vibration by a suitable power source such as motor 30, mounted on frame assembly 18. Motor 30 is typically, but not necessarily, an electric motor. Motor 30 is mounted so that its axis is at about a 45° angle with respect to the horizontal. This arrangement provides drive forces on conveyor 10 which have vertical force components and horizontal force components. The vertical force component lifts the material to be conveyed above the surface of the conveyor pan and the horizontal force component moves the material toward the outlet end 26 of the conveyor pan 22. Thus, as viewed in the drawings, the horizontal force component of the drive forces generated by motor 30 is directed to the right.

All of the elements of conveyor 10 described above are known per se, and will be understood by those skilled in the art. Accordingly, a more detailed description of conveyor 10 is not required.

A significant problem exists with conveyor 10 as just described. Because conveyor pan 22 is normally filled from above by a bucket 28, considerable clearance height is required over conveyor 10. In some cases, where sufficient clearance height is not available, it is impossible to install or use conveyor 10. Alternatively, extensive (and expensive) modifications may need to be made to the physical plant in which conveyor 10 is to be installed. Furthermore, since conveyor 10 is not movable, some way of feeding material to conveyor pan 22 is required, meaning that complicated and space-consuming material feed means need to be installed for each conveyor 10. Where it is desirable or necessary to use multiple conveyors 10, it is consequently necessary to install several separate feed means, one for each conveyor. This is expensive, requires a great deal of otherwise usable floor space, and adds complexity to the conveyor installation.

Moreover, the excessive clearance height mentioned above would be a significant problem no matter what apparatus is used to charge conveyor pan 22.

The present invention, by enabling conveyor pan 22 to be easily removable, eliminates these drawbacks. With the present invention, it is possible to load conveyor pan 22 with material at a central feed location away from conveyor 10 and then move the loaded pan to a conveyor for feeding the material to a desired receptacle. Thus, multiple pans, for multiple conveyors, can all be loaded at a single location, greatly simplifying plant layout and design and enabling great cost savings by eliminating the need for multiple feed systems. In addition, even where only a single conveyor is installed, pans can be loaded at a central feed location and serially moved to the conveyor, so that the conveyor can be kept in more-or-less continuous operation without the need to install complex continuous feed systems to load a permanently-attached conveyor pan 22.

Figure 4:
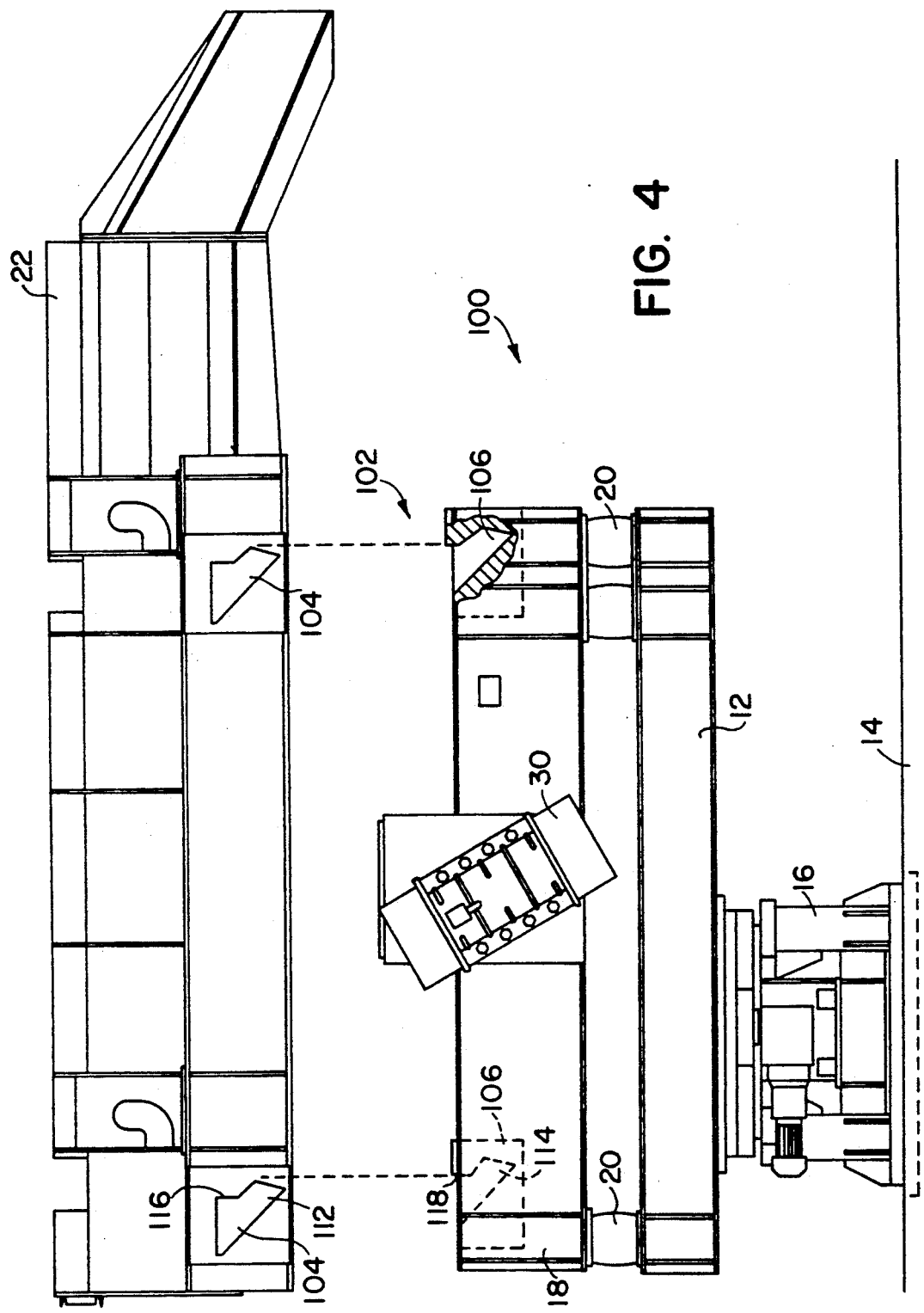
FIG. 4 is a side elevational view of the conveyor of FIG. 2, showing the pan means removed.

A conveyor 100 according to the present invention is illustrated in FIGS. 2 through 4. Those elements of the invention that are the same as the prior art conveyor 10 are referred to by the same reference numerals. Thus, conveyor 100 comprises a base 12 mounted on floor 14 via a resilient mounting means 16, as with conveyor 10. A frame assembly 18 is mounted to base 12 via vibration mounts 20. A motor 30 is mounted on frame assembly 18 to excite the conveyor 100 and impart the desired vibratory movement to it. A conveyor pan 22, having an inlet end 24 and an outlet end 26, is mounted to the top of frame assembly 18.

Where the conveyor 100 according to the invention departs from the prior art conveyor 10 is in how the conveyor pan 22 is mounted to the frame assembly 18. Instead of being permanently mounted on frame assembly 18, conveyor pan 22 is removably mounted to frame assembly 18 by means of cooperating connecting means, generally indicated by reference numeral 102, on both the frame member 18 and the conveyor pan 22.

Connecting means 102 comprises a male connecting member 104 and a female connecting member 106. As shown in the figures, male connecting member 104 is attached to conveyor pan 22 and female connecting member 106 is attached to frame member 18, although the opposite arrangement will work equally well. Thus, if desired, male connecting member 104 may be attached to frame member 18 and female connecting member 106 may be attached to conveyor pan 22. Connecting members may be attached to their respective parts of conveyor 100 by any suitable means, such as by welds 108, for example (see FIG. 3). The exact manner in which connecting members 104 and 106 are attached is not critical to the present invention, and any suitable way of attaching the connecting members, either directly or by means of intermediate members such as plate 110 (see FIG. 3) may be employed without departing from the invention.

An important feature of the connecting means 102 is that the male and female connecting members 104 and 106, respectively, have interengaging connector members arranged at an angle to the horizontal so as to resist movement in the directions of the force components created by motor 30 while permitting movement in the opposite directions. Hence, male connecting member 104 has an extension 112 disposed at approximately a 45° angle with respect to the horizontal, and female member 106 has a mating socket 114 disposed at the same angle and which is shaped to snugly receive male extension 112. The axes of extension 112 and socket 114 are thus substantially parallel to the axis of motor 30.

Male connecting member 104 also has a generally vertical forward face 116 which engages stop face 118 on female connecting member 106 when male extension 112 is received in female socket 114. This prevents movement to the right, as viewed in the figures, when conveyor pan 22 is subjected to the drive forces generated by motor 30. Thus, when conveyor 100 is excited by motor 30, the drive forces generated by the motor will urge conveyor pan 22 to the right, forcing male connecting member 104 tightly into female connecting member 106. As a result, conveyor pan 22 remains firmly in place on frame member 18 when conveyor 100 is excited by motor 30 for feeding material along conveyor pan 22. At the same time, when conveyor 22 is not in use, conveyor pan 22 may be easily removed from frame member 18 by simply lifting it upwardly and slightly to the rear, for example by using an overhead crane. The present invention thus makes it possible to removably, but securely, attach conveyor pan 22 to frame member 18 without having to bolt it or otherwise affix it to the frame member.

In the figures, connecting means 102 are shown at four corners of conveyor pan 22 (two connecting means are visible in the elevation shown in the figures, and two connecting means are located on the opposite side elevation of the conveyor). However, it should be understood that any number of connecting means as may be required may be used, and that the connecting means may be located at locations other than those shown, without departing from the scope of the invention.

The present invention may be embodied in other specific forms without departing from the spirit or essential attributes thereof and, accordingly, reference should be made to the appended claims, rather than to the foregoing specification, as indicating the scope of the invention.

We claim:

1. A vibratory flow feed conveyor having a removable conveyor pan, comprising
   (a) base means mounted on a supporting surface,
   (b) vibrator frame means fixed to said base means for oscillatory movement with respect thereto,
   (c) conveyor pan means mountable on said vibrator frame means,
   (d) connecting means on said conveyor pan means and cooperating mating connector means on said vibrator frame means for removably attaching said conveyor pan means to said vibrator frame means, wherein said connecting means and said mating connector means comprise respective male and female connector members disposed at an acute angle to a horizontal axis of said conveyor, and
   (e) vibrator means operatively associated with said vibrator frame means for imparting said oscillatory movement to said vibrator frame means and to said conveyor pan means through said connecting means and said mating connector means.

2. A conveyor according to claim 1, wherein said angle is approximately 45°.

3. A conveyor according to claim 1, wherein said male connector member is located on said conveyor pan means and said female connector member is located on said vibrator frame means.

4. A vibratory flow feed conveyor having a removable conveyor pan, comprising base means mounted on a supporting surface, vibrator frame means fixed to said base means for oscillatory movement with respect thereto, conveyor pan means mountable on said vibrator frame means, vibrator means operatively associated with said vibrator frame means for imparting to said vibrator frame means and said conveyor pan means a vibratory force, said force having a direction at an oblique angle relative to said conveyor pan means, connecting means on said conveyor pan means and cooperating mating connector means on said vibrator frame means for removably attaching said conveyor pan means to said vibrator frame means said connector means comprising interengaging connector members positioned to resist movement of said conveyor pan means in the direction of said force while permitting movement of said conveyor pan means in a direction perpendicular to that of said force.

5. A conveyor according to claim 4, wherein said interengaging connector members are positioned at a non-perpendicular angle to a horizontal axis of said conveyor.

6. A conveyor according to claim 5, wherein said non-perpendicular angle is 45°.

7. A conveyor according to claim 4, wherein said interengaging connector members comprise a female member having a socket therein mounted on said vibrator frame means and a male member mounted on said conveyor pan means and having an extension shaped to be snugly received in said socket.

8. In a vibratory flow feed conveyor having a removable conveyor pan, a base means mounted on a supporting surface, a vibrator frame means fixed to said base means for oscillatory movement with respect thereto, a conveyor pan means mountable on said vibrator frame means, and vibrator means operatively associated with said vibrator frame means for imparting to said vibrator frame means and said conveyor pan means a vibratory force, said force having a direction at an oblique angle relative to said conveyor pan means, a connector for removably connecting said conveyor pan means to said vibrator frame means, said connector comprising connecting means on said conveyor pan means and cooperating mating connector means located on said vibrator frame means for removably attaching said conveyor pan means to said vibrator frame means, said connector means comprising interengaging connector members positioned at an angle to a horizontal axis to said conveyor to resist movement of said conveyor pan means in the direction of said force while permitting movement of said conveyor pan means in a direction perpendicular to that of said force, said interengaging connector members comprising a female member having a socket therein mounted on said vibrator frame means and a male member mounted on said conveyor pan means and having an extension shaped to be snugly received in said socket.

* * * * *